United States Patent
Lan et al.

(10) Patent No.: US 10,400,171 B2
(45) Date of Patent: Sep. 3, 2019

(54) TRANS-POLYMER-DISPERSED LIQUID CRYSTAL MATERIAL COMPOSITION, SUBSTRATE, AND DISPLAY DEVICE

(71) Applicant: Shenzhen China Star Optoelectronics Technology Co., Ltd., Shenzhen, Guangdong (CN)

(72) Inventors: Song Lan, Guangdong (CN); Hsiao Hsien Chen, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/500,115

(22) PCT Filed: Jan. 17, 2017

(86) PCT No.: PCT/CN2017/071348
§ 371 (c)(1),
(2) Date: Jan. 30, 2017

(87) PCT Pub. No.: WO2018/120333
PCT Pub. Date: Jul. 5, 2018

(65) Prior Publication Data
US 2018/0216007 A1    Aug. 2, 2018

(51) Int. Cl.
*C09K 19/56* (2006.01)
*C09K 19/12* (2006.01)
(Continued)

(52) U.S. Cl.
CPC .............. *C09K 19/56* (2013.01); *C09K 19/12* (2013.01); *C09K 19/3003* (2013.01); *C09K 19/54* (2013.01); *C09K 19/544* (2013.01); *G02F 1/1334* (2013.01); *G02F 1/1339* (2013.01); *G02F 1/133788* (2013.01);
(Continued)

(58) Field of Classification Search
USPC .................. 428/1.1, 1.2; 349/123, 127, 130; 252/299.01
See application file for complete search history.

(56) References Cited

U.S. PATENT DOCUMENTS

| 5,305,126 A * | 4/1994 | Kobayashi ......... C09K 19/3852 349/183 |
| 2013/0314655 A1* | 11/2013 | Archetti ............. C09K 19/3003 349/124 |
| 2017/0322459 A1* | 11/2017 | Zhong ................... C09K 19/38 |

FOREIGN PATENT DOCUMENTS

| CN | 102660299 A | 9/2012 |
| CN | 103492531 A | 1/2014 |

(Continued)

OTHER PUBLICATIONS

International Search Report and Written Opinion for International Application No. PCT/CN2017/071348, dated Jan. 17, 2017.
(Continued)

*Primary Examiner* — Ruiyun Zhang

(57) ABSTRACT

Disclosed is a trans-PDLC liquid crystal material composition, including a vertical alignment agent, a liquid crystal material, and an acrylic monomer. Molecules of the vertical alignment agent include polar groups and non-polar groups. The vertical alignment agent can reduce surface energy of liquid crystal molecules in a polymer matrix and increase contact angle, so that the liquid crystal molecules can be arranged in a vertical way.

7 Claims, 2 Drawing Sheets

(51) Int. Cl.
    *C09K 19/30*    (2006.01)
    *C09K 19/54*    (2006.01)
    *G02F 1/1334*   (2006.01)
    *G02F 1/1337*   (2006.01)
    *G02F 1/1339*   (2006.01)

(52) U.S. Cl.
    CPC .. *C09K 2019/122* (2013.01); *C09K 2019/123* (2013.01); *C09K 2019/3009* (2013.01); *G02F 2001/133742* (2013.01); *Y10T 428/10* (2015.01); *Y10T 428/1005* (2015.01)

(56) References Cited

FOREIGN PATENT DOCUMENTS

| | | | |
|---|---|---|---|
| CN | 105527757 A | 4/2016 | |
| CN | 105733608 A | 7/2016 | |
| CN | 105974683 A | 9/2016 | |
| WO | WO-2016187948 A1 * | 12/2016 | ............. C09K 19/38 |

OTHER PUBLICATIONS

Chinese Office Action and Search Report for Chinese Patent Application No. 201611252491.4, dated Aug. 28, 2018.

* cited by examiner

TRANS-POLYMER-DISPERSED LIQUID CRYSTAL MATERIAL COMPOSITION, SUBSTRATE, AND DISPLAY DEVICE

CROSS-REFERENCE TO RELATED APPLICATIONS

The present application claims the priority of Chinese patent application CN 201611252491.4, entitled "Trans-PDLC liquid crystal material composition, substrate, and display device" and filed on Dec. 30, 2016, the entirety of which is incorporated herein by reference.

FIELD OF THE INVENTION

The present disclosure relates to the technical field of liquid crystal display devices, and in particular, to a trans-PDLC liquid crystal material composition, a trans-PDLC substrate material, and a display device made thereof.

BACKGROUND OF THE INVENTION

Polymer Dispersed Liquid Crystal (PDLC) is a material with electro-optical response characteristics, mainly working in between scattering state and transparent state and with a certain grayscale. It is made by the following steps: mixing low-molecule liquid crystals with a pre-polymer, polymerizing the obtained mixture under certain conditions to form micron-sized liquid crystal droplets evenly dispersed in macromolecule networks, and then forming PDLC by taking advantage of dielectric anisotropy of liquid crystal molecules. PDLC films are formed by combination of liquid crystals and a polymer and have excellent overall performance. Endowed with outstanding electro-optical characteristics by liquid crystal molecules, PDLC films have attracted great attention and have broad application prospects.

Compared with traditional display devices, PDLC display devices possess many advantages, such as, not requiring a polarizer or an alignment layer, manufacturing procedures being simple, easily made to be large-sized flexible display devices, etc. At present, PDLC display devices have been widely used in fields of optical modulators, temperature-sensitive and pressure-sensitive devices, electronic control glass, light valves, projection display, e-books, etc.

When there is no external voltage, no regular electric field can be formed between PDLC films. Optical axes of liquid crystal particles present themselves with randomly disorder orientations and their effective refractive indexes no do not match the refractive index of the polymer np, in which case light cannot pass through. When there is external voltage, liquid crystal molecules are arranged in a vertical way and their effective refractive indexes no match the refractive index of the polymer np, in which case light can pass through (as illustrated in FIG. 1). Display effects of the PDLC can be influenced by factors including thickness of films, mixing ratio of liquid crystals and the polymer, separation time, temperature, frequency of driving voltage, etc.

However, there are certain technical problems existing in the above-mentioned PDLC display devices. It requires a high driving voltage and has low transmissivity and contrast. Besides, the haze is insufficient when the device is in an off state.

SUMMARY OF THE INVENTION

To solve the existing technical problems in the present PDLC display devices, the present disclosure provides a trans-PDLC liquid crystal material composition, a trans-PDLC substrate material and a display device made thereof. A vertical alignment agent is added in the trans-PDLC liquid crystal material composition to reduce surface energy of liquid crystal molecules in a polymer matrix and increase contact angle, so that the liquid crystal molecules can be arranged in a vertical way. The trans-PDLC substrate material is made by coating the liquid crystal material composition on a substrate. In a trans-PDLC display device which is made of the substrate material, when no external electric field is applied, the liquid crystal molecules are arranged in a vertical way and their effective refractive indexes no match the refractive index of a polymer np, in which case light can pass through; when a voltage is applied, optical axes of liquid crystal particles present themselves with randomly disorder orientations and their effective refractive indexes no do not match the refractive index of the polymer np, in which case light cannot pass through.

According to one aspect of the present disclosure, a trans-PDLC liquid crystal material composition is provided. The trans-PDLC liquid crystal material composition comprises a vertical alignment agent, a liquid crystal material, and an acrylic monomer. Molecules of the vertical alignment agent comprise polar groups and non-polar groups.

Polar groups in the vertical alignment agent and polar groups in the acrylic monomer attract each other through formation of intermolecular forces (for example, hydrogen bond). Non-polar groups in the agent and the monomer extend into the liquid crystal and act as three-dimensional barriers, so that liquid crystal molecules can be arranged in a vertical way.

According to one preferred embodiment of the present disclosure, the liquid crystal material composition comprises 0.01%-5 wt %, preferably 0.5%-3 wt % of the vertical alignment agent, 78%-90 wt %, preferably 80%-85 wt % of the liquid crystal material, and 8%-20 wt %, preferably 10%48% of the acrylic monomer.

According to one preferred embodiment of the present disclosure, a general formula of the vertical alignment agent is Q-A-R (I). Q is a polar group, selected from amino, —OH, —COOH, —SH, —CN, —Si(CH$_3$)$_3$, —Si(OCH$_3$)$_3$, or —SiCl$_3$. The amino comprises one or more of primary amine, secondary amine or tertiary amine. A is a linking group, comprising flexible linking groups and/or rigid linking groups. R is a non-polar group, selected from substituted or un-substituted straight-chain or branched-chain alkyl groups of C$_{3\text{-}20}$. One or more —CH$_2$— groups therein can be optionally substituted by —O—, —CONH—, —COO—, —OCO—, —CO—, or —CH=CH— groups. One or more hydrogen atoms therein can be optionally substituted by fluorine atoms or Chlorine atoms.

According to one preferred embodiment of the present disclosure, a general formula of the flexible linking groups is —(CH$_2$)$_m$— (II), 1≤m≤8. In certain specific embodiments, one or more —CH$_2$— groups therein can be optionally substituted by —O—, —S—, —CO—, —COO—, —OCO—, —O—COO—, —OCH$_2$—, or —CH$_2$O— groups.

According to one preferred embodiment of the present disclosure, a general formula of the rigid linking groups is

(III)

A therein is one or more kinds of five-membered rings, six-membered rings, benzene rings or aromatic fused rings and 1≤n≤6. One or more hydrogen atoms in ring A can be optionally substituted by halogen atoms, alkyl groups, alkoxy groups or ester groups.

In certain specific embodiments, the vertical alignment agent applicable to the present disclosure comprises one or more compounds shown in formula (IV) to formula (VIII):

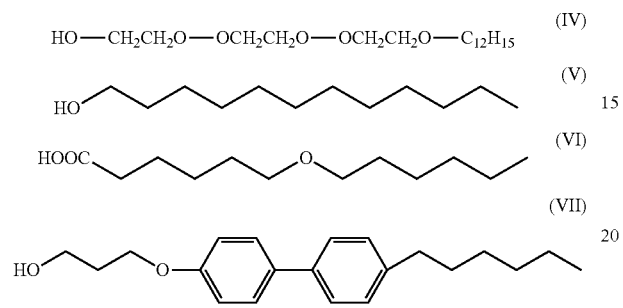

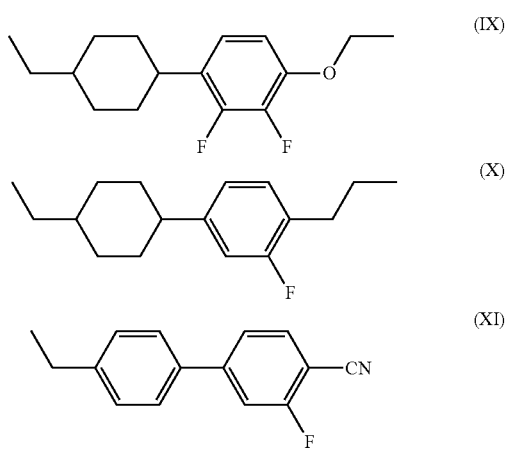

According to one preferred embodiment of the present disclosure, the acrylic monomer applicable to the present disclosure is selected from compounds shown in formula (i), formula (ii), or formula (iii):

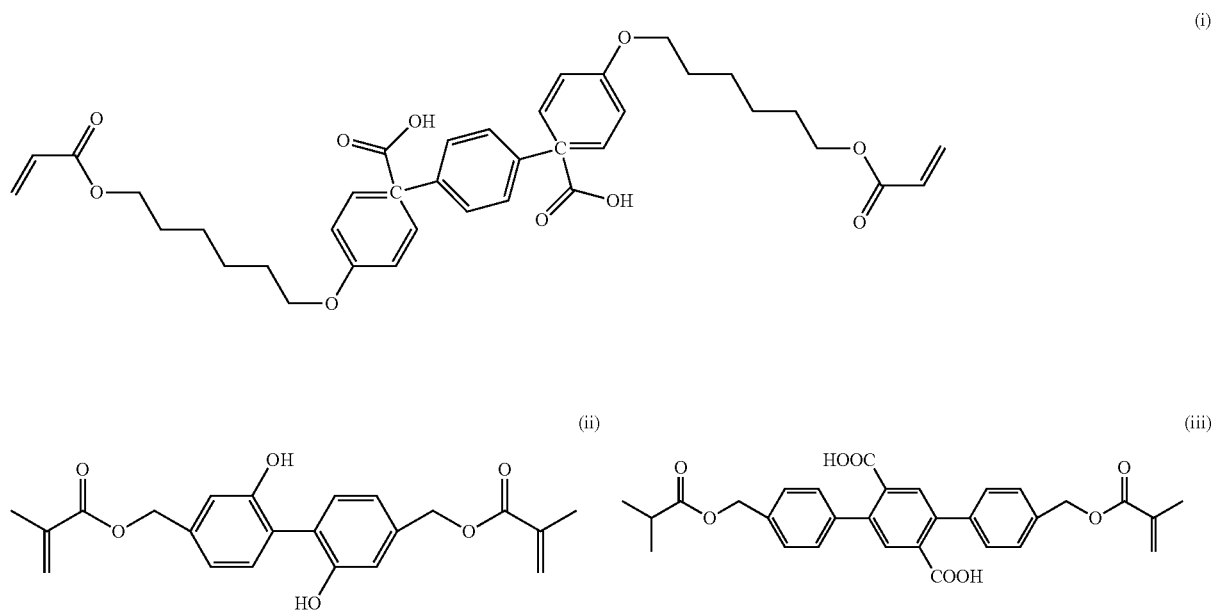

-continued (VIII)

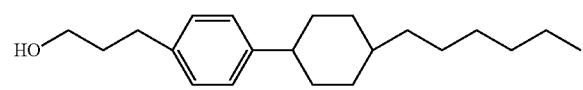

According to one preferred embodiment of the present disclosure, the liquid crystal material is a negative liquid crystal material. There is no particular restriction on the negative liquid crystal material. Any common negative liquid crystal material in the art will be appropriate.

In certain specific embodiments, the negative liquid crystal material applicable to the present disclosure can be compounds shown in formula (IX), formula (X), or formula (XI):

According to another aspect of the present disclosure, a trans-PDLC substrate material is provided. The trans-PDLC substrate material comprises a substrate material prepared by coating a liquid crystal material composition on a substrate followed by treatment. There is no particular restriction on the treatment which is a common treatment method in the art.

According to another aspect of the present disclosure, a trans-PDLC display device is provided. It is manufactured according to the following steps.

A liquid crystal material composition is coated on a substrate, so as to form at least one substrate material.

The substrate material with another substrate coated or not coated with the liquid crystal material composition are fitted together and then sealed, so as to form a liquid crystal cell.

The liquid crystal cell is treated with ultraviolet irradiation.

In certain specific embodiments, the trans-PDLC display device can be manufactured according to the following steps.

(1) The negative liquid crystal material, the acrylic monomer and the vertical alignment agent are well mixed, so as to form a trans-PDLC liquid crystal material composition.

(2) The trans-PDLC liquid crystal material composition is coated on a substrate, so as to form at least one substrate material.

(3) In a vacuum environment, the substrate material and another substrate coated or not coated with the crystal material composition are fitted together and sealed with a sealant which is then cured, so as to form a liquid crystal cell.

(4) liquid crystal cell is treated with ultraviolet irradiation, so as to form the trans-PDLC display device.

According to one preferred embodiment of the present disclosure, in Step (3), the substrate material can be fitted with another substrate material, their side coated with the liquid crystal material composition facing each other. Alternatively, the substrate material can be fitted with another substrate, a side of the substrate material coated with the liquid crystal material composition facing the substrate.

According to the manufacturing method of the trans-PDLC display device, there is no particular restriction on the curing method in Step (3). Curing by heat or ultraviolet irradiation, for example, is applicable. A curing temperature can be set between 100~140° C., and a curing time set between 30~90 min. A wavelength of the ultraviolet radiation can be set to be 365 nm, illuminance thereof set between 60~110 mW/cm$^2$ and a radiation time set between 20~50 s.

According to the manufacturing method of the trans-PDLC display device, there is no particular restriction on the method of ultraviolet irradiation in Step (4). For example, a wavelength of ultraviolet light can be set between 320~400 nm, illuminance thereof set between 60~110 mW/cm$^2$ and a radiation time set between 5~30 min. Preferably, the wavelength of the ultraviolet light can be set to be 365 nm, illuminance thereof set to be 85 mW/cm$^2$ and a radiation time set to be 15 min.

In the present disclosure, a vertical alignment agent is added in the trans-PDLC liquid crystal material, which can reduce surface energy of liquid crystal molecules in a polymer matrix, increase contact angle and thus enable the liquid crystal molecules to be arranged in a vertical way. In a trans-PDLC display device made of the trans-PDLC liquid crystal material, when there is no external electric field, the liquid crystal molecules are arranged in a vertical way and their effective refractive indexes no match the refractive index of a polymer np, in which case light can pass through; when a voltage is applied, optical axes of liquid crystal particles present themselves with randomly disorder orientations and the effective refractive indexes no do not match the refractive index of the polymer np, in which case light cannot pass through. The trans-PDLC display devices in the present disclosure require a low driving voltage and have high contrast.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

Figure 1:
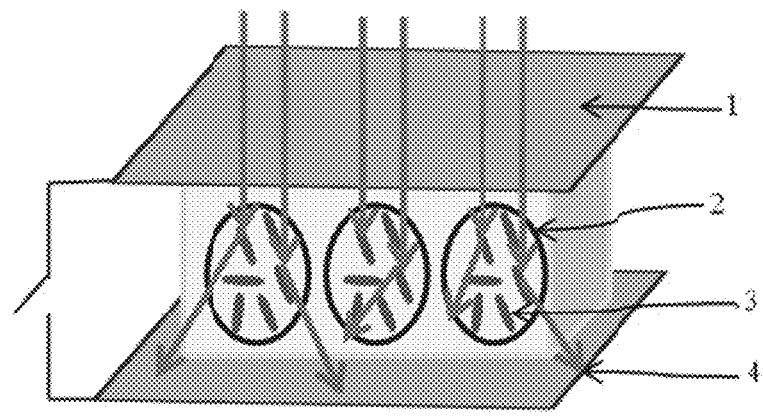
FIG. 1 schematically shows transmission of light in a PDLC display device when no external voltage is applied.
Figure 2:
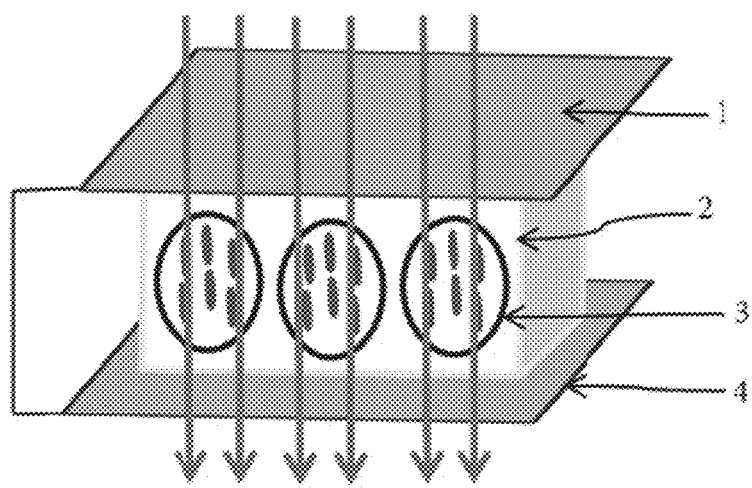
FIG. 2 schematically shows transmission of light in a PDLC display device when an external voltage is applied.
Figure 3:
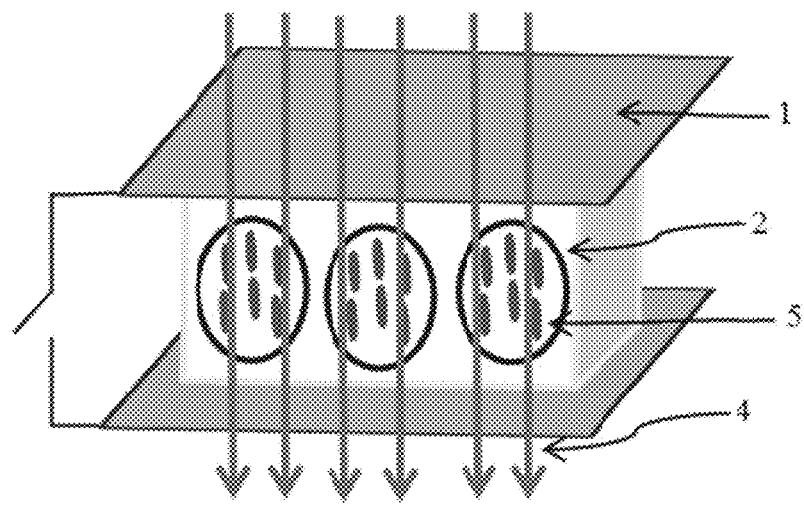
FIG. 3 schematically shows transmission of light in a trans-PDLC display device when no external voltage is applied.
Figure 4:
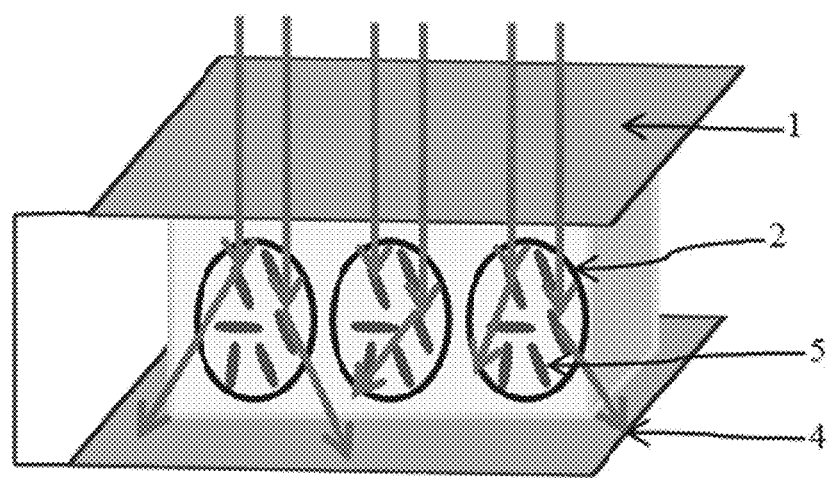
FIG. 4 schematically shows transmission of light in a trans-PDLC display device when an external voltage is applied.

Technical solutions of the present disclosure will be illustrated further hereinafter in combination with specific embodiments.

Embodiment 1

(1) A trans-PDLC liquid crystal material composition is prepared, using 3 wt % of a vertical alignment agent, 85 wt % of a negative liquid crystal material, and 12 wt % of an acrylic monomer.

The vertical alignment agent is OH—CH$_2$CH$_2$O—OCH$_2$CH$_2$O—OCH$_2$CH$_2$O—C$_{12}$H$_{15}$. The negative liquid crystal material is a compound shown in formula (IX). The acrylic monomer is a compound shown in formula (i).

(2) The trans-PDLC liquid crystal material composition is coated on a CF substrate, so as to form a CF substrate material.

(3) In a vacuum environment, the CF substrate material and a TFT substrate are fitted together and sealed with a sealant which is then cured by heating, so as to form a liquid crystal cell.

(4) The liquid crystal cell is treated with ultraviolet irradiation, so as to form a trans-PDLC display device. A wavelength of ultraviolet light used is 365 nm, illuminance thereof is 85 mW/cm$^2$, and radiation time is 15 min.

Embodiment 2

(1) A trans-PDLC liquid crystal material composition is prepared, using 1 wt % of a vertical alignment agent, 84 wt % of a negative liquid crystal material, and 15 wt % of an acrylic monomer.

The vertical alignment agent is a compound shown in formula (V). The negative liquid crystal material is a compound shown in formula (X). The acrylic monomer is a compound shown in formula (ii).

(2) The trans-PDLC liquid crystal material composition is coated on a TFT substrate, so as to form a TFT substrate material.

(3) In a vacuum environment, a CF substrate and the TFT substrate material are fitted together and sealed with a sealant which is then cured by ultraviolet irradiation, so as to form a liquid crystal cell.

(4) The liquid crystal cell is treated with ultraviolet irradiation, so as to form a trans-PDLC display device. A wavelength of ultraviolet light used is 330 nm, illuminance thereof is 70 mW/cm$^2$, and radiation time is 20 min.

Embodiment 3

(1) A trans-PDLC liquid crystal material composition is prepared, using 0.01 wt % of a vertical alignment agent, 90 wt % of a negative liquid crystal material, and 9.99 wt % of an acrylic monomer.

The vertical alignment agent is a compound shown in formula (VI). The negative liquid crystal material is a compound shown in formula (XI). The acrylic monomer is a compound shown in formula (iii).

(2) The trans-PDLC liquid crystal material composition is coated on a CF substrate and a TFT substrate, so as to form a CF substrate material and a TFT substrate material.

(3) in a vacuum environment, the CF substrate material and the TFT substrate material are fitted together and sealed with a sealant which is then cured by ultraviolet irradiation, so as to form a liquid crystal.

(4) The liquid crystal cell is treated with ultraviolet irradiation, so as to form a trans-PDLC display device. A wavelength of ultraviolet light used is 320 nm, illuminance thereof is 80 mW/cm² and radiation time is 30 min.

Embodiment 4

(1) A trans-PDLC liquid crystal material composition is prepared, using 2 wt % of a vertical alignment agent, 78 wt % of a negative liquid crystal material, and 20 wt % of an acrylic monomer.

The vertical alignment agent is a compound shown in formula (VII). The negative liquid crystal material is a compound shown in formula (XI). The acrylic monomer is a compound shown in formula (iii).

(2) The trans-PDLC liquid crystal material composition is coated on a CF substrate and a TFT substrate, so as to form a CF substrate material and a TFT substrate material.

(3) In a vacuum environment, the CF substrate material and the TFT substrate material are fitted together and sealed with a sealant which is then cured by ultraviolet irradiation, so as to form a liquid crystal cell.

(4) The liquid crystal cell is treated with ultraviolet irradiation, so as to form a trans-PDLC display device. A wavelength of ultraviolet light used is 380 nm, illuminance thereof is 100 mW/cm² and radiation time is 25 min.

Embodiment 5

(1) A trans-PDLC liquid crystal material composition is prepared, using 5 wt % of a vertical alignment agent, 87 wt % of a negative liquid crystal material, and 8 wt % of an acrylic monomer.

The vertical alignment agent is a compound shown in formula (VIII). The negative liquid crystal material is a mixture of compounds shown in formula (X) and formula (XI). The acrylic monomer is a compound shown in formula (ii).

(2) The trans-PDLC liquid crystal material composition is coated on a CF substrate, so as to form a CF substrate material.

(3) In a vacuum environment, the CF substrate material and a TFT substrate are fitted together and sealed with a sealant which is then cured by heating, so as to form a liquid crystal cell.

(4) The liquid crystal cell is treated with ultraviolet irradiation, so as to form a trans-PDLC display device. A wavelength of ultraviolet light used is 400 nm, illuminance thereof is 90 mW/cm², and radiation time is 5 min.

It is found through tests that contrast of trans-PDLC display devices in the present disclosure is 13-14 and penetration rate thereof is 89%-92%. Contrast of traditional PDC display devices is 5-6 and penetration rate thereof is 75%. It can be seen that trans-PDLC in the present disclosure can remarkably increase the contrast and the penetration rate.

Values mentioned in the present disclosure comprise all the values at one-unit intervals between minimum ones and maximum ones, if there are only two units therebetween. For example, if quantity of a component, or technical variables such as temperature, pressure, time, etc. are declared to be 50-90, it means that values such as 51-89, 52-88, . . . , 69-71, etc. are enumerated in detail in the description. As for values that are not integers, it can be considered to choose 0.1, 0.01, 0.001, or 0.0001 as a unit. These are only some examples which are particularly pointed out. In the present disclosure, all possible combinations of values enumerated between minimum ones and maximum ones in a similar way are deemed as open to the public.

It should be noted that, the above embodiments are only used for illustrating, rather than restricting the present disclosure. The present disclosure is illustrated in detail in combination with typical embodiments hereinabove, but it should be understood that, words used therein are descriptive and explanatory words, rather than restrictive words. Those skilled in the art can make revisions to the present disclosure without departing from the protection scope of claims and make amendments to the present disclosure without departing from the spirit and scope of the present disclosure. Though the present disclosure involves particular methods, materials and embodiments, it does not mean that the present disclosure is limited by the specific embodiments disclosed herein. On the contrary, the present disclosure can be extended to all other methods and applications with identical functions.

DESCRIPTION OF THE REFERENCE SIGNS

1 substrate
2 polymer
3 positive liquid crystal material
4 transmitted light
5 negative liquid crystal material

The invention claimed is:

1. A trans-polymer-dispersed liquid crystal material composition, comprising a vertical alignment agent, a liquid crystal material, and an acrylic monomer, wherein molecules of the vertical alignment agent comprise polar groups and non-polar groups;

wherein the acrylic monomer is selected from compounds shown in formula (ii) or formula (iii)

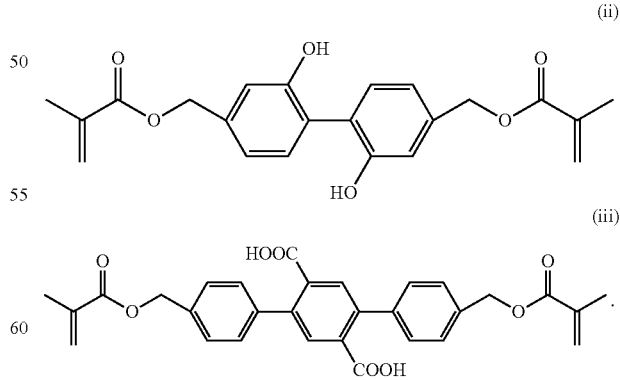

2. The liquid crystal material composition according to claim 1, comprising 0.01%-5 wt % of the vertical alignment agent, 78%-90 wt % of the liquid crystal material, and 8%-20 wt % of the acrylic monomer.

3. The liquid crystal material composition according to claim 1, wherein a general formula of the vertical alignment agents is Q-A-R (I), wherein:

Q is a polar group, selected from amino, —OH, —COOH, —SH, —CN, —Si(CH3)3, —Si(OCH3)3, or —SiCl3;

A is a linking group, comprising flexible linking groups and/or rigid linking groups; and R is a non-polar group, selected from substituted or un-substituted straight-chain or branched-chain alkyl groups of C3-20, wherein one or more —CH2- groups can be optionally substituted by —O—, —CONH—, —COO—, —OCO—, —CO—, or —CH=CH— groups, and wherein one or more hydrogen atoms can be optionally substituted by fluorine atoms or chlorine atoms.

4. The liquid crystal material composition according to claim 3, wherein a general formula of the flexible linking groups is —(CH2)m-(II), wherein:

1≤m≤8; and one or more —CH2- groups can be optionally substituted by —O—, —S—, —CO—, —COO—, —OCO—, —OCOO—, —OCH2-, or —CH2O— groups.

5. The liquid crystal material composition according to claim 3, wherein a general formula of the rigid linking groups is

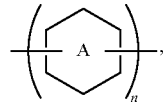

(III)

wherein:

A is one or more kinds of five-membered rings, six-membered rings, benzene rings or aromatic fused rings; 1≤n≤6; and one or more hydrogen atoms in ring A can be optionally substituted by halogen atoms, alkyl groups, alkoxy groups or ester groups.

6. The liquid crystal material composition according to claim 3, wherein the vertical alignment agent comprises one or more compounds shown in formula (IV) to formula (VIII):

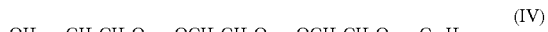

(IV)

(V)

(VI)

(VII)

(VIII)

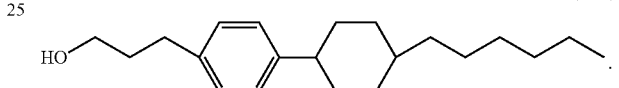

7. The liquid crystal material composition according to claim 1, wherein the liquid crystal material is a negative liquid crystal material.

* * * * *